Dec. 22, 1942.　　　H. MARUHN　　　2,305,791
DIESEL ENGINE
Filed Jan. 7, 1939　　　2 Sheets-Sheet 1

Inventor:
Herbert Maruhn
by
his Attorney.

Dec. 22, 1942.   H. MARUHN   2,305,791
DIESEL ENGINE
Filed Jan. 7, 1939   2 Sheets-Sheet 2

Inventor:
Herbert Maruhn
by
Attorney.

Patented Dec. 22, 1942

2,305,791

UNITED STATES PATENT OFFICE 2,305,791

DIESEL ENGINE

Herbert Maruhn, Stuttgart-Bad Cannstatt, Germany; vested in the Alien Property Custodian Application January 7, 1939, Serial No. 249,802
In Germany January 5, 1938

11 Claims. (Cl. 123—33)

This invention relates to Diesel engines of the kind wherein injection takes place through an injection cell, that is to say a fore-chamber opening into the combustion chamber.

One object of the invention is to provide an engine of this type, in which at low speed of the engine a considerable part of the fuel passes from the injection cell to the combustion chamber without having been intimately mixed with air and without having been ignited, while at increasing engine speed the flow resistance of the connecting channel between the injection cell and the combustion chamber increases, whereby a greater part of the fuel injected into the injection cell is ignited therein, and another portion of the fuel is whirled around thoroughly and mixed intimately with air before entering the combustion chamber.

Another object of the invention is to provide an engine, in which the inner surface of the connecting channel between injection cell and combustion chamber is relatively large so as to transmit a substantial quantity of heat to the fuel passing therethrough thereby facilitating the ignition.

A still further object of the invention is to produce a device of the type described which can be easily and cheaply manufactured, and which may be assembled and taken apart in a simple manner.

According to the invention, these and other objects, which will become apparent as the description proceeds, are accomplished by the construction and combination of elements set forth in the following detailed description, defined in the appended claims and illustratively exemplified in the accompanying drawings, in which Figs. 1 to 3 are longitudinal sections through three embodiments of injection cells with connecting channels according to the invention.

Figs. 4, 5, 7 and 8 are to a larger scale than Figs. 1, 2, 3, 6, 9 and 10.

Figure 1:
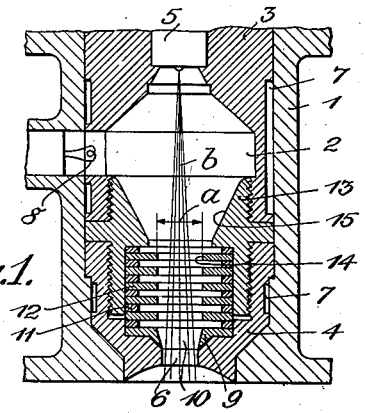

Referring to Figs. 1, 2, 3, 9 and 10, the cylinder head includes a passage formed by a substantially cylindrical wall 1, in which the injection cell or chamber 2 is formed by cavities in two plugs 3 and 4. The fuel nozzle 5 opens into the cavity of plug 3 and discharges through a passage 6 in the plug 4. The plugs 3 and 4 are recessed on their outer surfaces at 7 so as to provide heat insulating gaps. A spark plug 8 projects into an opening at one side of the plug 3 communicating with the ignition cell.

Figure 10:
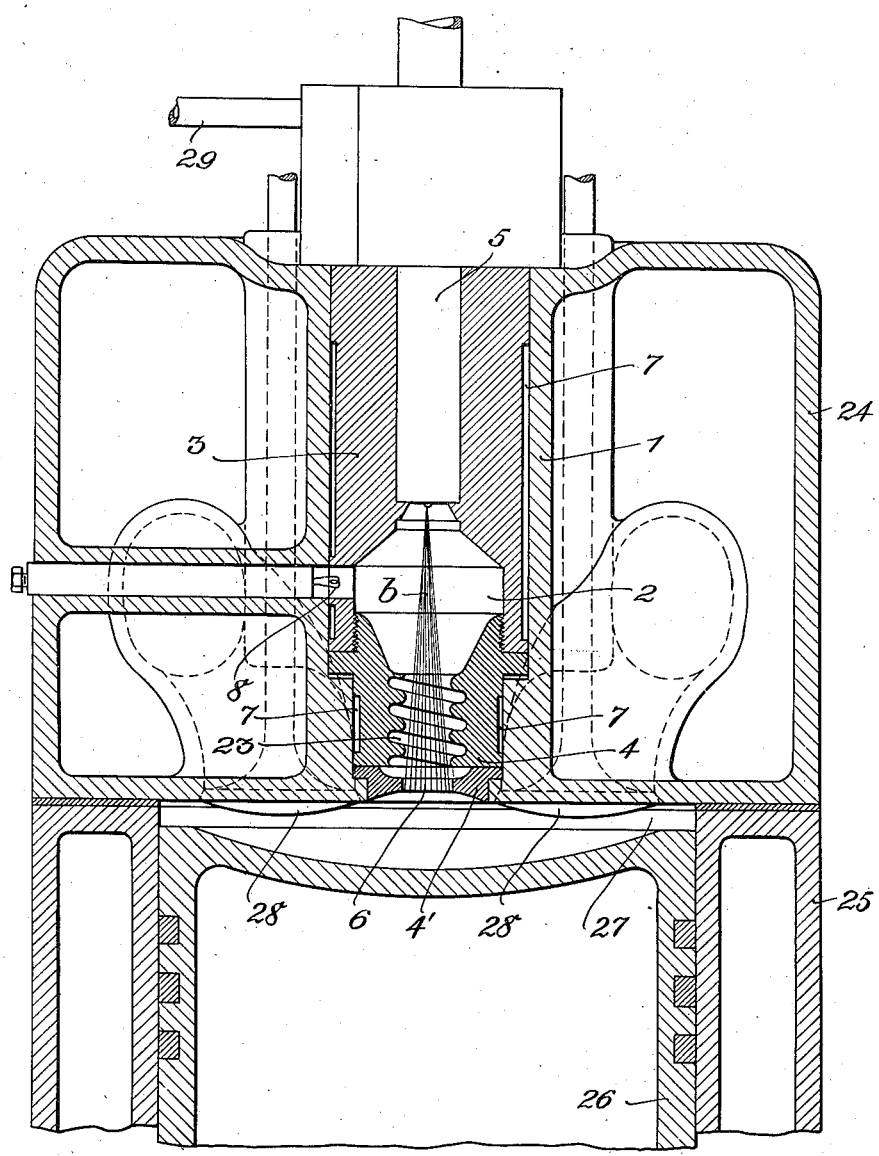
Fig. 10 is a longitudinal section through the upper part of a Diesel engine illustrating a still further embodiment of the invention in conjunction with the accessory parts.

The engine shown in Fig. 10 may be a two stroke or four stroke engine. The injection cell is disposed in the cylinder head 24, at the top of the cylinder 25. 26 denotes the piston. The fuel is sprayed into the combustion chamber 27 which has ports controlled by valves 28. Fuel is supplied at 29.

Referring to Fig. 1, the plug 4 is recessed and accommodates a ring 9 having a central bore 10 tapering towards the combustion chamber. The ring 9 supports a series of rings 11 and 12 alternating with each other. The plugs 3 and 4 are internally threaded and the rings 9, 11 and 12 are held together by a screw plug 13 screwed into the plugs 3 and 4. The bores 14 of the rings 12 form the open connecting channel. The plug 13 is provided with a bore 15 tapering towards this passage of substantially greater diameter than that of the bores 14. The vertical dimensions of the circular chambers within the connecting passage depend on the thickness of the rings.

The device operates as follows: When the engine is started, part of the injected fuel passes directly into the combustion chamber through the channel a. The fuel remaining in the injection chamber is mixed with the inflowing air and ignited. The increased pressure caused thereby ejects the fuel into the combustion chamber where further combustion takes place. The openings 14, 16 and 10 of alternately increasing and decreasing size causes eddies in and effective dispersion of the fuel especially at high speeds of the engine. It is an important feature of the invention that the air flowing into the injection cell absorbs heat from the comparatively large area of the wall of the connecting channel whereby ignition is facilitated.

In an internal combustion engine the motion of the mixture is accelerated or retarded in proportion with the increasing or decreasing number of revolutions of the engine. The constricted passage between the injection cell and the combustion chamber exerts a throttling effect on the fuel stream passing therethrough. In the present construction, the connecting channel, owing to the series of substantially parallel annular grooves provided therein, produces a considerably increased throttling effect which increases with the velocity of the fuel in the chamber *a* and vice versa. At normal and high engine speed the throttling effect is more marked and less fuel passes directly into the combustion chamber than when the engine speed is lower. On the other hand, when the engine is started more fuel passes directly and practically undiluted with air into the combustion chamber than at normal engine speed whereby the starting is facilitated. The invention thus accomplishes by pneumatic means an effect which has hitherto been obtained only by mechanical means such as throttles.

Figure 2:
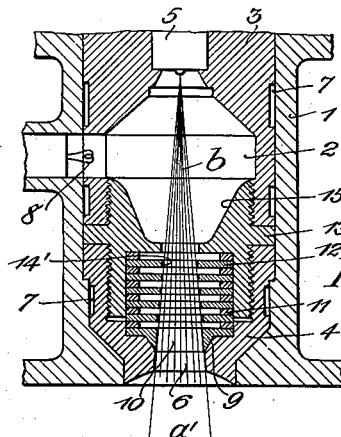

Fig. 2 illustrates a modification in which the openings 14' of the rings 12 increases in diameter towards the combustion chamber 2 so that the passage *a'* tapers towards the injection cell. This improves the dispersion of the air entering the chamber 2 and reduces resistance to the air jet. A conical passage may also be produced by giving the rings 12 at 12" a funnel shape as shown for example in Fig. 4. The desired effect may be intensified by providing supplementary holes 17 in the rings 12 as shown in Fig. 5.

Figure 3:
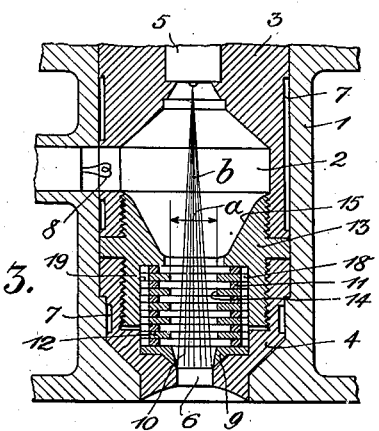
Figure 6:
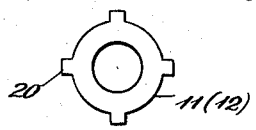
Figure 7:
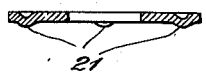

The plugs 3, 4 and 13 may be shaped to influence the radiation of heat. There may also be provided an insulating gap between the rings 11, 12 and the plugs surrounding the same as shown in Fig. 3. In this case, the plug 13 has an enlarged bore 18 so that a gap 19 is formed. The rings 12 and 13 are centred by means of spacer lugs 20 (Fig. 6). Alternatively, the centering may be effected by means of annular ridges 21, as shown in Fig. 7. Additional heat insulation may be obtained by making the rings 11 and 12 of heat insulating material, for example porcelain.

Figure 8:
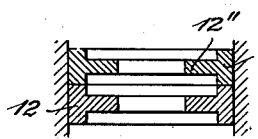
Figs. 4 to 8 show various forms of rings which may be assembled to form connecting channels according to the invention.
Figure 4:
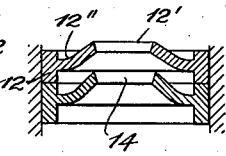
Figure 5:
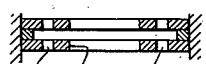

The distance rings 11 may be dispensed with, if the rings 12 are made thicker, as shown in Figs. 4 and 8, and are provided with ribs 12". It will be understood that all of these modifications may be used in combination with each other.

Figure 9:
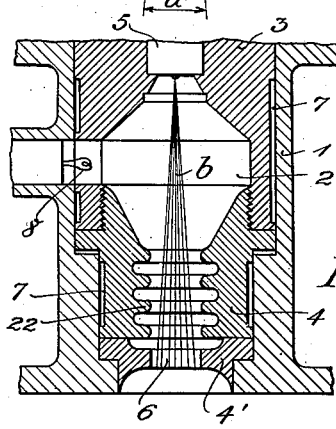
Fig. 9 shows another form of construction in longitudinal section.

In the form of construction shown in Fig. 9, the base of the injection chamber is formed by a plate 4' which is clamped into the cylinder head by the plug 4. The passage through the plug 4 has a series of ribs 22 separated by parallel annular grooves. Alternatively, the plug 4 may be provided with a helical channel, as shown in Fig. 10, forming a kind of screw thread 23.

What I claim as my invention and desire to secure by Letters Patent of the United States is:

1. In an internal combustion engine having a combustion chamber and a fuel injection cell, means connecting said fuel injection cell with said combustion chamber, said means comprising an element provided with an axial cylindrical bore, a plurality of centrally perforated discs disposed in said bore in superposed relationship, the bores of alternate discs forming a permanently open axial passage of a diameter less than that of the injection cell and the bores of the remaining discs having a diameter exceeding that of said axial passage, and a second element secured to said first element to hold said discs in position.

2. In an internal combustion engine having a primary explosion cell and a combustion chamber, the combination of a channel connecting said cell and combustion chamber and a stack of superposed centrally perforated discs disposed in said channel, the bores of alternate discs having a diameter exceeding that of the bores of the remaining discs to define an open axial passage of a diameter considerably smaller than that of said cell and a plurality of substantially annular and parallel grooves in the inner wall of said passage.

3. In an internal combustion engine having a primary explosion cell and a combustion chamber, means connecting said cell and combustion chamber, said means comprising an element provided with an axial cylindrical bore, a stack of superposed centrally perforated discs disposed in said bore, said discs being formed and arranged to define an open axial passage of a diameter considerably smaller than that of said cell and a plurality of substantially annular and parallel grooves in the inner wall of said passage, all said discs having an outer diameter less than that of said cylindrical bore in said element, and radially projecting spacer lugs centering the discs in said cylindrical bore whereby heat insulating gaps are formed between the outer walls of said discs and the inner wall of said cylindrical bore.

4. In an internal combustion engine having a combustion chamber, a single compartment primary explosion cell, and an injection nozzle opening into said cell at one side thereof, a connecting channel extending from the side of said cell opposite the mouth of the injection nozzle to the combustion chamber substantially in axial alignment with the fuel jet traversing the cell in direct contact with the main mass of air therein, said channel having an axial passage permanently open during the operation of the engine and of a diameter considerably smaller than that of said cell, the inner wall of said passage being peripherally grooved to provide a plurality of peripheral substantially parallel recesses of a radial depth and axial width to exert on said fuel jet in said passage a throttling action which increases with increasing velocity of the fuel jet, said peripheral recesses being axially spaced to leave between them alternate peripheral and substantially parallel wall portions of an inner diameter smaller than that of said recesses.

5. An arrangement, as claimed in claim 4, in which the diameter of said peripheral recesses is approximately double that of said open passage.

6. An arrangement, as claimed in claim 4, in which the radial depth of said peripheral recesses exceeds their axial width and is approximately equal to the radius of said passage.

7. An arrangement, as claimed in claim 4, in which the axial distance between successive peripheral recesses is substantially equal to the axial width of the recesses and inferior to the radial depth of the recesses.

8. In an internal combustion engine having a combustion chamber, a single compartment primary explosion cell, and an injection nozzle opening into said cell at one side thereof, a connecting channel extending from the side of said cell opposite the mouth of the injection nozzle to the combustion chamber substantially in axial alignment with the fuel jet traversing the cell in direct contact with the main mass of air contained therein, said channel having an axial passage permanently open during the operation of the engine and of a diameter considerably smaller than that of said cell, the inner wall of said passage being provided with a plurality of separate substantially annular and parallel grooves of a radial depth and axial width to exert on said fuel jet in said passage a throttling action which increases with increasing velocity of the fuel jet, said peripheral grooves being axially spaced from one another to leave between them alternate substantially annular and parallel ribs of an inner diameter smaller than that of said grooves.

9. In an internal combustion engine having a combustion chamber, a single compartment primary explosion cell, and an injection nozzle opening into said cell at one side thereof, a connecting channel extending from the side of said cell opposite the mouth of the injection nozzle to the combustion chamber substantially in axial alignment with the fuel jet traversing the cell in direct contact with the main mass of air contained therein, said channel having an axial passage permanently open during the operation of the engine and of a diameter considerably smaller than that of said cell, the inner wall of said passage being provided with a plurality of substantially annular and parallel grooves of a radial depth and axial width to exert on said fuel jet in said passage a throttling action which increases with increasing velocity of the fuel jet, said grooves being disposed in planes at right angles to the axis of the connecting channel and being axially spaced from one another to leave between them alternate substantially annular and parallel ribs of an inner diameter smaller than that of said grooves.

10. In an internal combustion engine having a primary explosion cell and a combustion chamber, the combination of a channel connecting said cell and combustion chamber and a stack of superposed centrally perforated discs disposed in said channel, said discs being formed and arranged to define an open axial passage of a diameter considerably smaller than that of said cell and a plurality of substantially annular and parallel grooves in the inner wall of said passage.

11. In an internal combustion engine having a primary explosion cell and a combustion chamber, means connecting said cell and combustion chamber, said means comprising an element provided with an axial cylindrical bore, a stack of superposed centrally perforated discs disposed in said bore, said discs being formed and arranged to define an open axial passage of a diameter considerably smaller than that of said cell and a plurality of substantially annular and parallel grooves in the inner wall of said passage, and a second element secured to said first element to hold said discs in position.

HERBERT MARUHN.